United States Patent
Watz et al.

(10) Patent No.: US 9,809,155 B2
(45) Date of Patent: Nov. 7, 2017

(54) RETRACTABLE STEERING COLUMN ASSEMBLY HAVING LEVER, VEHICLE HAVING RETRACTABLE STEERING COLUMN ASSEMBLY, AND METHOD

(71) Applicant: Steering Solutions IP Holding Corporation, Saginaw, MI (US)

(72) Inventors: Christopher F. Watz, Bay City, MI (US); Todd M. King, Saginaw, MI (US); James E. Rouleau, Burt, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/924,633

(22) Filed: Oct. 27, 2015

(65) Prior Publication Data
US 2017/0113712 A1    Apr. 27, 2017

(51) Int. Cl.
*B62D 1/185* (2006.01)
*B62D 1/183* (2006.01)
*B60Q 1/14* (2006.01)

(52) U.S. Cl.
CPC ........... *B60Q 1/1469* (2013.01); *B62D 1/183* (2013.01)

(58) Field of Classification Search
CPC . B62D 1/12; B62D 1/16; B62D 1/183; B62D 1/185; B62D 1/192; B60Q 1/1469
See application file for complete search history.

(56) References Cited

U.S. PATENT DOCUMENTS

| | | | |
|---|---|---|---|
| 4,315,117 A | * | 2/1982 | Kokubu ................. B60Q 1/425 200/5 R |
| 4,337,967 A | | 7/1982 | Yoshida et al. |
| 4,503,300 A | * | 3/1985 | Lane, Jr. .............. B60Q 1/1469 200/61.54 |
| 4,503,504 A | | 3/1985 | Suzumura et al. |
| 4,561,323 A | | 12/1985 | Stromberg |
| 4,691,587 A | | 9/1987 | Farrand et al. |
| 4,836,566 A | | 6/1989 | Birsching |
| 4,921,066 A | | 5/1990 | Conley |
| 4,962,570 A | | 10/1990 | Hosaka et al. |
| 4,967,618 A | | 11/1990 | Matsumoto et al. |

(Continued)

FOREIGN PATENT DOCUMENTS

| | | |
|---|---|---|
| CN | 1722030 | 1/2006 |
| CN | 1736786 | 2/2006 |

(Continued)

OTHER PUBLICATIONS

China Patent Application No. 201510204221.5 Second Office Action dated Mar. 10, 2017, 8 pages.

(Continued)

*Primary Examiner* — Barry Gooden, Jr.
(74) *Attorney, Agent, or Firm* — Cantor Colburn LLP

(57) ABSTRACT

A steering column assembly includes a steering column having a longitudinal axis; and a lever. The lever includes a first end and a second end. The second end of the lever is attached to the steering column. A hinge is disposed between the first end and the second end of the lever. The first end of the lever is biased away from the steering column in a first condition and folded at the hinge towards the steering column in a second condition.

22 Claims, 4 Drawing Sheets

(56) References Cited

U.S. PATENT DOCUMENTS

| | | | |
|---|---|---|---|
| 4,976,239 | A | 12/1990 | Hosaka |
| 5,240,284 | A | 8/1993 | Takada et al. |
| 5,295,712 | A | 3/1994 | Omura |
| 5,319,803 | A | 6/1994 | Allen |
| 5,488,555 | A | 1/1996 | Asgari et al. |
| 5,618,058 | A | 4/1997 | Byon |
| 5,668,721 | A | 9/1997 | Chandy |
| 5,690,362 | A | 11/1997 | Peitsmeier et al. |
| 5,765,116 | A | 6/1998 | Wilson-Jones et al. |
| 5,893,580 | A | 4/1999 | Hoagland et al. |
| 5,911,789 | A | 6/1999 | Keipert et al. |
| 6,070,686 | A * | 6/2000 | Pollmann ............ B60R 25/0221 180/287 |
| 6,170,862 | B1 | 1/2001 | Hoagland et al. |
| 6,227,571 | B1 | 5/2001 | Sheng et al. |
| 6,301,534 | B1 | 10/2001 | McDermott, Jr. et al. |
| 6,354,622 | B1 | 3/2002 | Ulbrich et al. |
| 6,360,149 | B1 | 3/2002 | Kwon et al. |
| 6,373,472 | B1 | 4/2002 | Palalau et al. |
| 6,381,526 | B1 | 4/2002 | Higashi et al. |
| 6,390,505 | B1 | 5/2002 | Wilson |
| 6,578,449 | B1 | 6/2003 | Anspaugh et al. |
| 6,612,393 | B2 | 9/2003 | Bohner et al. |
| 6,819,990 | B2 | 11/2004 | Ichinose |
| 7,021,416 | B2 | 4/2006 | Kapaan et al. |
| 7,048,305 | B2 | 5/2006 | Muller |
| 7,062,365 | B1 | 6/2006 | Fei |
| 7,295,904 | B2 | 11/2007 | Kanevsky et al. |
| 7,308,964 | B2 | 12/2007 | Hara et al. |
| 7,428,944 | B2 | 9/2008 | Gerum |
| 7,461,863 | B2 | 12/2008 | Muller |
| 7,495,584 | B1 | 2/2009 | Sorensen |
| 7,628,244 | B2 | 12/2009 | Chino et al. |
| 7,719,431 | B2 | 5/2010 | Bolourchi |
| 7,735,405 | B2 | 6/2010 | Parks |
| 7,793,980 | B2 | 9/2010 | Fong |
| 7,862,079 | B2 | 1/2011 | Fukawatase et al. |
| 7,894,951 | B2 | 2/2011 | Norris et al. |
| 7,909,361 | B2 | 3/2011 | Oblizajek et al. |
| 8,002,075 | B2 | 8/2011 | Markfort |
| 8,027,767 | B2 | 9/2011 | Klein et al. |
| 8,055,409 | B2 | 11/2011 | Tsuchiya |
| 8,069,745 | B2 | 12/2011 | Strieter et al. |
| 8,079,312 | B2 | 12/2011 | Long |
| 8,146,945 | B2 | 4/2012 | Born et al. |
| 8,170,725 | B2 | 5/2012 | Chin et al. |
| 8,260,482 | B1 | 9/2012 | Szybalski et al. |
| 8,352,110 | B1 | 1/2013 | Szybalski et al. |
| 8,479,605 | B2 | 7/2013 | Shavrnoch et al. |
| 8,548,667 | B2 | 10/2013 | Kaufmann |
| 8,606,455 | B2 | 12/2013 | Boehringer et al. |
| 8,634,980 | B1 | 1/2014 | Urmson et al. |
| 8,650,982 | B2 | 2/2014 | Matsuno et al. |
| 8,670,891 | B1 | 3/2014 | Szybalski et al. |
| 8,695,750 | B1 | 4/2014 | Hammond et al. |
| 8,818,608 | B2 | 8/2014 | Cullinane et al. |
| 8,825,258 | B2 | 9/2014 | Cullinane et al. |
| 8,825,261 | B1 | 9/2014 | Szybalski et al. |
| 8,843,268 | B2 | 9/2014 | Lathrop et al. |
| 8,874,301 | B1 | 10/2014 | Rao et al. |
| 8,880,287 | B2 | 11/2014 | Lee et al. |
| 8,881,861 | B2 | 11/2014 | Tojo |
| 8,899,623 | B2 | 12/2014 | Stadler et al. |
| 8,909,428 | B1 | 12/2014 | Lombrozo |
| 8,948,993 | B2 | 2/2015 | Schulman et al. |
| 8,950,543 | B2 | 2/2015 | Heo et al. |
| 8,994,521 | B2 | 3/2015 | Gazit |
| 9,002,563 | B2 | 4/2015 | Green et al. |
| 9,031,729 | B2 | 5/2015 | Lathrop et al. |
| 9,032,835 | B2 | 5/2015 | Davies et al. |
| 9,045,078 | B2 | 6/2015 | Tovar et al. |
| 9,073,574 | B2 | 7/2015 | Cuddihy et al. |
| 9,092,093 | B2 | 7/2015 | Jubner et al. |
| 9,108,584 | B2 | 8/2015 | Rao et al. |
| 9,134,729 | B1 | 9/2015 | Szybalski et al. |
| 9,150,200 | B2 | 10/2015 | Urhahne |
| 9,150,224 | B2 | 10/2015 | Yopp |
| 9,164,619 | B2 | 10/2015 | Goodlein |
| 9,174,642 | B2 | 11/2015 | Wimmer et al. |
| 9,186,994 | B2 | 11/2015 | Okuyama et al. |
| 9,193,375 | B2 | 11/2015 | Schramm et al. |
| 9,199,553 | B2 | 12/2015 | Cuddihy et al. |
| 9,227,531 | B2 | 1/2016 | Cuddihy et al. |
| 9,233,638 | B2 | 1/2016 | Lisseman et al. |
| 9,235,111 | B2 | 1/2016 | Davidsson et al. |
| 9,235,987 | B2 | 1/2016 | Green et al. |
| 9,238,409 | B2 | 1/2016 | Lathrop et al. |
| 9,248,743 | B2 | 2/2016 | Enthaler et al. |
| 9,260,130 | B2 | 2/2016 | Mizuno |
| 9,290,174 | B1 | 3/2016 | Zagorski |
| 9,290,201 | B1 | 3/2016 | Lombrozo |
| 9,298,184 | B2 | 3/2016 | Bartels et al. |
| 9,308,857 | B2 | 4/2016 | Lisseman et al. |
| 9,308,891 | B2 | 4/2016 | Cudak et al. |
| 9,333,983 | B2 | 5/2016 | Lathrop et al. |
| 9,852,752 | | 5/2016 | Cullinane et al. |
| 9,360,865 | B2 | 6/2016 | Yopp |
| 2003/0046012 | A1 | 3/2003 | Yamaguchi |
| 2003/0094330 | A1 | 5/2003 | Boloorchi et al. |
| 2003/0188598 | A1 | 10/2003 | Cartwright |
| 2003/0227159 | A1 | 12/2003 | Muller |
| 2004/0016588 | A1 | 1/2004 | Vitale et al. |
| 2004/0046346 | A1 | 3/2004 | Eki et al. |
| 2004/0099468 | A1 | 5/2004 | Chernoff et al. |
| 2004/0129098 | A1 | 7/2004 | Gayer et al. |
| 2004/0204808 | A1 | 10/2004 | Satoh et al. |
| 2004/0262063 | A1 | 12/2004 | Kaufmann et al. |
| 2005/0001445 | A1 | 1/2005 | Ercolano |
| 2005/0081675 | A1 | 4/2005 | Oshita et al. |
| 2005/0197746 | A1 | 9/2005 | Pelchen et al. |
| 2005/0275205 | A1 | 12/2005 | Ahnafield |
| 2006/0186658 | A1 | 8/2006 | Yasuhara et al. |
| 2006/0224287 | A1 | 10/2006 | Izawa et al. |
| 2006/0244251 | A1 | 11/2006 | Muller |
| 2007/0021889 | A1 | 1/2007 | Tsuchiya |
| 2007/0029771 | A1 | 2/2007 | Haglund et al. |
| 2007/0046003 | A1 | 3/2007 | Mori et al. |
| 2007/0046013 | A1 | 3/2007 | Bito |
| 2007/0241548 | A1 | 10/2007 | Fong |
| 2007/0284867 | A1 | 12/2007 | Cymbal et al. |
| 2008/0009986 | A1 | 1/2008 | Lu et al. |
| 2008/0238068 | A1 | 10/2008 | Kumar et al. |
| 2009/0024278 | A1 | 1/2009 | Kondo et al. |
| 2009/0256342 | A1 | 10/2009 | Cymbal et al. |
| 2009/0276111 | A1 | 11/2009 | Wang et al. |
| 2009/0292466 | A1 | 11/2009 | McCarthy et al. |
| 2010/0152952 | A1 | 6/2010 | Lee et al. |
| 2010/0218637 | A1 | 9/2010 | Barroso |
| 2010/0222976 | A1 | 9/2010 | Haug |
| 2010/0228417 | A1 | 9/2010 | Lee et al. |
| 2010/0228438 | A1 | 9/2010 | Buerkle |
| 2010/0280713 | A1 | 11/2010 | Stahlin et al. |
| 2010/0286869 | A1 | 11/2010 | Katch et al. |
| 2010/0288567 | A1 | 11/2010 | Bonne |
| 2011/0098922 | A1 | 4/2011 | Ibrahim |
| 2011/0153160 | A1 | 6/2011 | Hesseling et al. |
| 2011/0167940 | A1 | 7/2011 | Shavrnoch et al. |
| 2011/0187518 | A1 | 8/2011 | Strumolo et al. |
| 2011/0266396 | A1 | 11/2011 | Abildgaard et al. |
| 2011/0282550 | A1 | 11/2011 | Tada et al. |
| 2012/0136540 | A1 | 5/2012 | Miller |
| 2012/0205183 | A1 | 8/2012 | Rombold |
| 2012/0209473 | A1 | 8/2012 | Birsching et al. |
| 2012/0215377 | A1 | 8/2012 | Takemura et al. |
| 2013/0002416 | A1 | 1/2013 | Gazit |
| 2013/0087006 | A1 | 4/2013 | Ohtsubo et al. |
| 2013/0158771 | A1 | 6/2013 | Kaufmann |
| 2013/0199866 | A1 | 8/2013 | Yamamoto et al. |
| 2013/0218396 | A1 | 8/2013 | Moshchuk et al. |
| 2013/0233117 | A1 | 9/2013 | Read et al. |
| 2013/0325202 | A1 | 12/2013 | Howard et al. |
| 2014/0028008 | A1 | 1/2014 | Stadler et al. |
| 2014/0046542 | A1 | 2/2014 | Kauffman et al. |
| 2014/0046547 | A1 | 2/2014 | Kauffman et al. |

(56) References Cited

U.S. PATENT DOCUMENTS

| | | | |
|---|---|---|---|
| 2014/0111324 A1 | 4/2014 | Lisseman et al. | |
| 2014/0277896 A1 | 9/2014 | Lathrop et al. | |
| 2014/0300479 A1 | 10/2014 | Wolter et al. | |
| 2014/0309816 A1 | 10/2014 | Stefan et al. | |
| 2015/0002404 A1 | 1/2015 | Hooton | |
| 2015/0014086 A1 | 1/2015 | Eisenbarth | |
| 2015/0032322 A1 | 1/2015 | Wimmer | |
| 2015/0051780 A1 | 2/2015 | Hahne | |
| 2015/0060185 A1 | 3/2015 | Feguri | |
| 2015/0120142 A1 | 4/2015 | Park et al. | |
| 2015/0137492 A1 | 5/2015 | Rao et al. | |
| 2015/0203145 A1 | 7/2015 | Sugiura et al. | |
| 2015/0210273 A1 | 7/2015 | Kaufmann et al. | |
| 2015/0246673 A1 | 9/2015 | Tseng et al. | |
| 2015/0251666 A1 | 9/2015 | Attard et al. | |
| 2015/0283998 A1 | 10/2015 | Lind et al. | |
| 2015/0324111 A1 | 11/2015 | Jubner et al. | |
| 2016/0009332 A1* | 1/2016 | Sirbu | B62L 3/04 180/220 |
| 2016/0075371 A1 | 3/2016 | Varunkikar et al. | |
| 2016/0082867 A1 | 3/2016 | Sugioka et al. | |
| 2016/0185387 A1 | 6/2016 | Kuoch | |
| 2016/0200246 A1 | 7/2016 | Lisseman et al. | |
| 2016/0200343 A1 | 7/2016 | Lisseman et al. | |
| 2016/0200344 A1 | 7/2016 | Sugioka et al. | |
| 2016/0207538 A1 | 7/2016 | Urano et al. | |
| 2016/0209841 A1 | 7/2016 | Yamaoka et al. | |
| 2016/0229450 A1 | 8/2016 | Basting et al. | |
| 2016/0231743 A1 | 8/2016 | Bendewald et al. | |
| 2016/0318540 A1 | 11/2016 | King | |
| 2016/0318542 A1 | 11/2016 | Pattok et al. | |
| 2016/0347347 A1 | 12/2016 | Lubischer | |
| 2016/0347348 A1 | 12/2016 | Lubischer | |
| 2016/0362084 A1 | 12/2016 | Martin et al. | |
| 2016/0362117 A1 | 12/2016 | Kaufmann et al. | |
| 2016/0362126 A1 | 12/2016 | Lubischer | |
| 2016/0368522 A1 | 12/2016 | Lubischer | |
| 2016/0375770 A1 | 12/2016 | Ryne et al. | |
| 2016/0375860 A1 | 12/2016 | Lubischer | |
| 2016/0375923 A1 | 12/2016 | Schulz | |
| 2016/0375924 A1 | 12/2016 | Bodtker et al. | |
| 2016/0375925 A1 | 12/2016 | Lubischer et al. | |
| 2016/0375926 A1 | 12/2016 | Lubischer et al. | |
| 2016/0375927 A1 | 12/2016 | Schulz | |
| 2016/0375928 A1 | 12/2016 | Magnus | |
| 2016/0375929 A1 | 12/2016 | Rouleau | |
| 2016/0375931 A1 | 12/2016 | Lubischer | |
| 2017/0029009 A1 | 2/2017 | Rouleau | |
| 2017/0029018 A1 | 2/2017 | Lubischer | |

FOREIGN PATENT DOCUMENTS

| | | |
|---|---|---|
| CN | 101037117 | 9/2007 |
| CN | 101041355 | 9/2007 |
| CN | 101596903 | 12/2009 |
| CN | 102452391 | 5/2012 |
| CN | 103419840 | 12/2013 |
| DE | 19523214 A1 | 1/1997 |
| DE | 19923012 | 11/2000 |
| DE | 10212782 A1 | 10/2003 |
| DE | 102005032528 | 1/2007 |
| DE | 102005056438 A1 | 6/2007 |
| DE | 102006025254 | 12/2007 |
| DE | 102008057313 A1 | 10/2009 |
| DE | 102010025197 A1 | 12/2011 |
| EP | 1559630 A2 | 8/2005 |
| EP | 1783719 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 | 5/2005 |
| FR | 3016327 A1 | 7/2015 |
| JP | H05162652 | 6/1993 |
| KR | 20100063433 A | 6/2010 |
| WO | 2006099483 A1 | 9/2006 |
| WO | 2010082394 A1 | 7/2010 |
| WO | 2010116518 | 10/2010 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Partial European Search Report dated Sep. 23, 2014, 6 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicla Dynamics"; Society of Automotive Enginers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Partial European Search Report for related European Patent Application No. 14156903.8, dated Sep. 23, 2014, 6 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.

* cited by examiner

RETRACTABLE STEERING COLUMN ASSEMBLY HAVING LEVER, VEHICLE HAVING RETRACTABLE STEERING COLUMN ASSEMBLY, AND METHOD

BACKGROUND OF THE INVENTION

The following description relates to steering column assemblies and, more specifically, to a retractable steering column assembly having a lever.

When some vehicles are fitted with autonomous driving assist systems ("ADAS"), it may become possible to retract the steering column and wheel away from the driver to provide space for non-driving related activities such as working, reading, game playing, etc. However, steering column attachments, such as turn signal levers and washing fluid and wiper levers mounted on the column, may interfere with an instrument cluster of a vehicle during forward storage of the steering column. That is, due to the turn signal lever and the washing fluid/wiper lever, a steering wheel is limited in the distance that it may be retracted towards an instrument cluster without causing damage to the levers or instrument cluster. Thus, cabin space in the vehicle is correspondingly limited by the distance that the steering wheel can travel during retraction.

Accordingly, it is desirable to provide a steering column assembly enabling an increase in cabin space during forward retraction of the steering wheel.

BRIEF SUMMARY OF THE INVENTION

A steering column assembly includes a steering column having a longitudinal axis; and a lever. The lever includes a first end and a second end. The second end of the lever is attached to the steering column. A hinge is disposed between the first end and the second end of the lever. The first end of the lever is biased away from the steering column in a first condition and folded at the hinge towards the steering column in a second condition.

A vehicle includes an instrument cluster and a steering column assembly. The steering column assembly includes a steering column having a longitudinal axis, the steering column movable along the longitudinal axis and with respect to the instrument cluster between an extended position and a retracted position. The steering column assembly further includes a lever having a first end and a second end, the second end of the lever attached to the steering column. A hinge is disposed between the first end and the second end of the lever. The first end of the lever is biased away from the steering column in the extended position of the steering column and folded at the hinge towards the steering column in the retracted position of the steering column.

A method of operating a steering column assembly in a vehicle includes retracting a steering input device connected to an end of a steering column towards an instrument cluster; engaging an edge of the instrument cluster with a lever connected to the steering column; and, folding at least a portion of the lever towards the steering column about a hinge of the lever when the lever engages with the edge during retraction of the steering input device.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
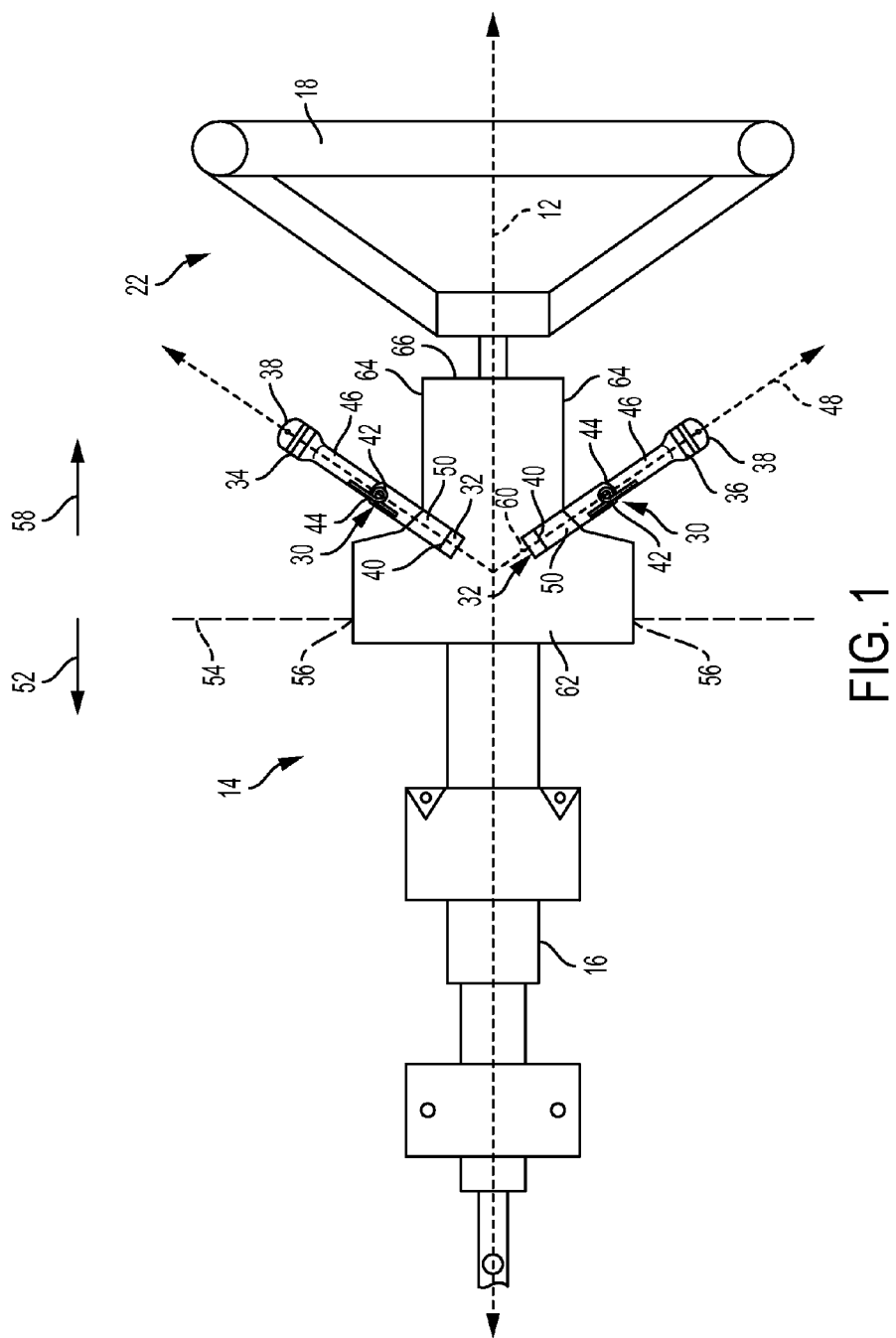
FIG. 1 is a top view of an embodiment of a retractable steering column in an extended condition.

Referring now to the Figures, where the invention will be described with reference to specific embodiments, without limiting same, Turning now to FIG. 1, an embodiment of a steering column assembly 14 includes a steering column 16 extending generally along a longitudinal axis 12. A steering input device 18, such as a steering wheel, is attached to the steering column 16 for driver operated steering of a vehicle 10 (see FIG. 5). Attachments, such as one or more levers 30, are connected to the steering column 16, such as by connectors 32, which provide the levers 30 with the mechanical and electrical connections necessary to enable the levers 30 to be used for various vehicle operations. For example, the levers 30 may include a washing fluid and wiper lever 34 for selectively applying washing fluid to front and rear windows, turning on or off front and rear window wipers, and selecting speed and intermittency of front window wipers. The levers 30 may also include a turn signal lever 36 for signaling right and left hand turns. The turn signal lever 36 may further include controls for headlamp operation, including, but not limited, to high and low beam operation. While basic operations of levers 30 have been described, the levers 30 or other attachments may include any other control devices as deemed necessary for a particular vehicle 10.

At least one of the levers 30, and as shown both of the levers 30, includes a first end 38 and a second end 40. The first end 38 is a "free end" accessible for operator handling. The second end 40 of the lever is connected to the steering column 16 by the connector 32. In addition to providing electrical connections to related components within the vehicle 10, the connector 32 enables the lever 30 to move relative to the steering column 16 at the connector 32. Such movement may include rotational movement with respect to the steering column 16. For example, the turn signal lever 36 may move in a counterclockwise direction with respect to the steering column 16 (when looking at the steering input device 18 from a driver's seat) for a left turn, and in a clockwise direction with respect to the steering column 16 for a right turn. The lever 30 may include dials that pivot about the lever axis, such as for selecting between various components or wiper speeds. The lever 30 may further include any number of buttons or switches for providing additional operator controls, such as at or adjacent to the first end 38 of the lever 30.

Figure 2:
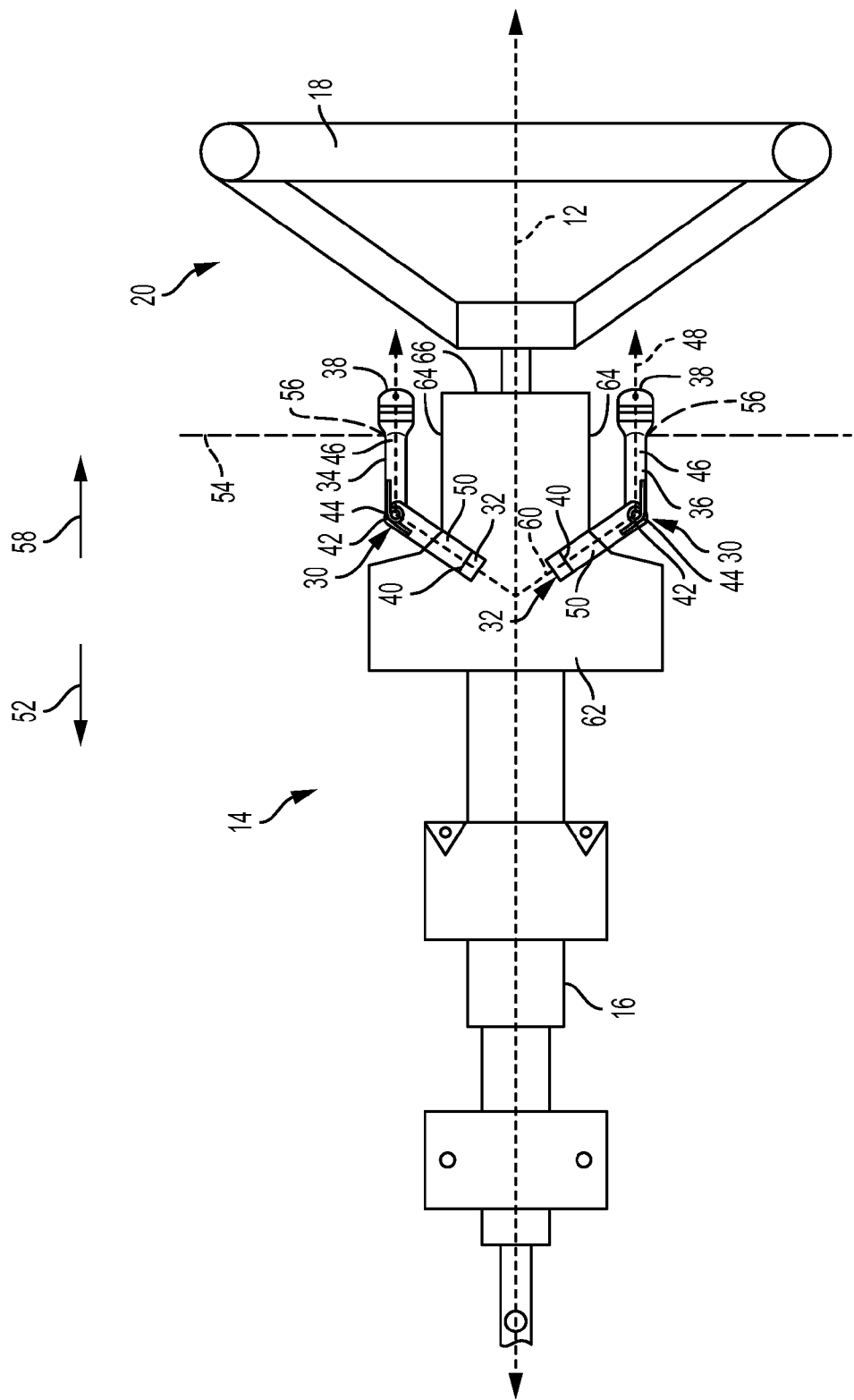
FIG. 2 is a top view of the retractable steering column in a retracted condition.
Figure 3:
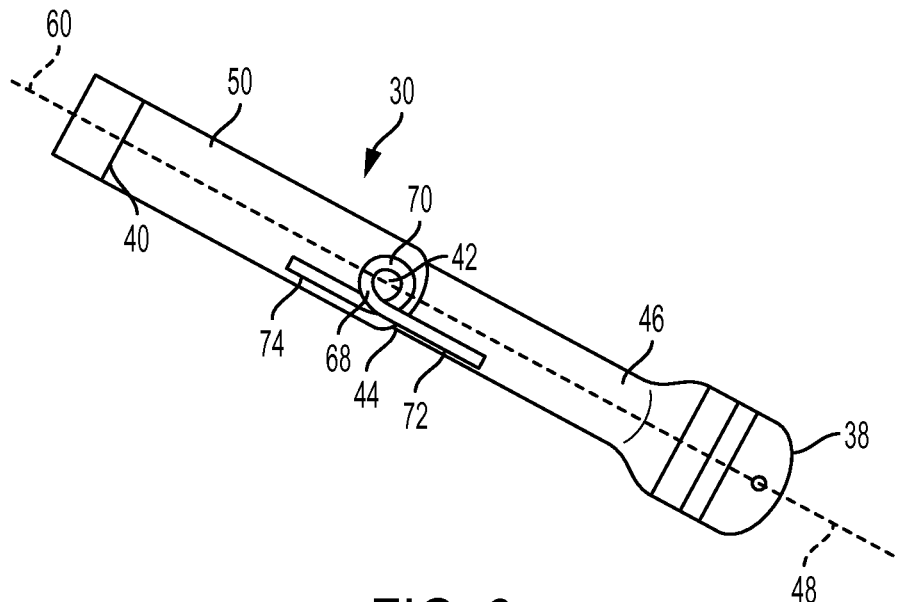
FIG. 3 is a top view of one embodiment of a lever for the retractable steering column, depicted in a biased first condition.
Figure 4:
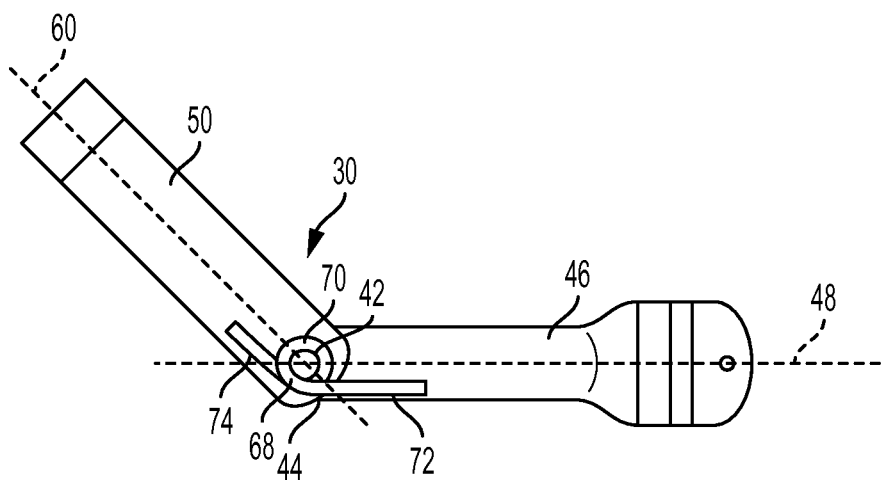
FIG. 4 is a top view of the lever, depicted in a folded second condition.

As depicted in FIGS. 1 and 2, as well as in FIGS. 3 and 4, the lever 30 includes a hinge 42 at a pivot area 44. A first section 46 of the lever 30 extends between the pivot area 44 and the first end 38. The hinge 42 biases the first section 46 radially outwardly away from the steering column 16 in a biased first condition shown in FIG. 1, but enables the first end 38 of the lever 30 to pivot towards the steering column 16 against the bias of the first section 46 in a folded second condition shown in FIG. 2. In one embodiment, as shown in FIG. 2, the first section 46 of the lever 30 may pivot towards the steering column 16 such that a longitudinal axis 48 of the first section 46 is substantially parallel to the longitudinal axis 12 of the steering column 16. Further, a second section 50 of the lever 30 may be interposed between the pivot area 44 and the connector 32 such that the hinge 42 is spaced from the connector 32 by the second section 50. The hinge 42 acts independently from the connector 32 to bias the first end 38 of the lever 30 in the first condition shown in FIG. 1 away from the steering column 16, in which the first section 46 is disposed at a non-zero angle with respect to the longitudinal axis 12 of the steering column 16. In this biased first condition, the lever 30 is in a position accessible and usable by the driver. When the steering column 16 is moved in direction 52 to retract the steering wheel 18 towards the instrument cluster 54 as shown in FIG. 2, the first section 46 is forced against its bias by an edge 56 on the instrument cluster 54 to move the first end 38 closer to the steering column 16 and reduce the angle between the longitudinal axis 48 of the first section 46 and the longitudinal axis 12 of the steering column 16. A second condition of the lever 30 is shown in FIG. 2 with the first section 46 folded towards the steering column 16. The edge 56 of the instrument cluster 54 for each lever 30 serves as a camming surface to pivot the first section 46 radially inward towards the steering column 16. When the steering column 16 is moved in direction 58 to extend the steering wheel 18 towards the driver and away from the instrument cluster 54, the first section 46 automatically pivots radially outwardly to its biased first condition shown in FIG. 1 to move the first end 38 further from the steering column 16 and expand the angle between the longitudinal axis 48 of the first section 46 and the longitudinal axis 12 of the steering column 16.

In embodiments of the lever 30 including the second section 50, the second section 50 may retain the same angle between the longitudinal axis 60 of the second section 50 and the longitudinal axis 12 of the steering column 16 in both the first and second conditions of the lever 30. That is, only the first section 46 of the lever 30 pivots radially inwardly from the first condition to the second condition, against the bias of the hinge 42, and only the first section 46 of the lever 30 pivots radially outwardly from the second condition to the first condition, when free from the instrument cluster 54. In one embodiment, as illustrated, the longitudinal axis 60 of the second section 50 aligns with the longitudinal axis 48 of the first section 46 in the first condition of the lever 30. Alternatively, the first section 46 may be biased by the hinge 42 to depend at a non-zero angle from the second section 50. Since the second section 50 does not fold inwardly during retraction, the second section 50 may be shorter in length than the first section 46 so as not to interfere with the instrument cluster 54 during retraction.

The steering column assembly 14 may further include a steering column shroud 62 that covers and/or protects the connectors 32 that connect the levers 30 to the steering column 16. To accommodate the folded lever 30 or levers 30 in the retracted position of the steering wheel 18, the shroud 62 may be provided with a lever receiving area 64, such as a scalloped section, indent, or pocket, that extends at least from a longitudinal area corresponding to the pivot area 44 of the lever 30 to a longitudinal area corresponding to the first end 38 of the lever 30 in the second condition or to an end 66 of the shroud 62, whichever is shorter. As in the illustrated embodiment, since the first section 46 extends beyond the end 66 of the shroud 62 in the second condition of the lever 30, the receiving area 64 extends to the end of the shroud 62.

In one embodiment of the lever 30, the hinge 42 includes a spring 68, as shown in FIGS. 3 and 4. The spring 68 is biased in the first condition shown in FIG. 3, but the lever 30 may be folded as shown in FIG. 4 against the spring bias in the second condition. The stored energy in the spring 68 in the second condition enables the lever 30 to return to the biased first condition of FIG. 3 when the steering wheel 18 is in the extended position 22 shown in FIG. 1. While the illustrated spring 68 includes a torsion spring with a winding 70 at the pivot area 44, a first leg 72 fixed to the first section 46, and a second leg 74 fixed to the second section 50, with tangential leg orientation and approximately 180 degree leg angle in the biased first condition, alternative springs and spring arrangements may be included in the lever 30 to bias the first section 46 of the lever 30 at a desired angle with respect to the second section 50 as well as with respect to the longitudinal axis 12 of the steering column 16 in the first condition. The hinge 42 is further configured on lever 30 such that a normal range of motion of the lever 30 during its operation by a driver does not cause collapsible folding at the hinge 42. That is, the lever 30 will not be accidentally folded inward during operation of the lever 30 for its intended use, e.g. wipers, lights, etc.

The steering column 16 may be moved to the retracted position 20 in order to provide more space for the driver of the vehicle 10. Additionally, during a frontal vehicle collision, the steering column 16 will also move forward in the vehicle 10 in direction 52 and absorb kinetic energy to protect the driver. During this motion of the steering column 16, the levers 30 may also be actuated from the deployed and biased first condition as shown in FIG. 1 (where they are usable for driving), to the folded second condition shown in FIG. 2. The ability of the levers 30 to pivot provides a more consistent performance and can prevent the levers 30 from breaking from the column 16. During a collision, this minimizes the chance that fractured parts of the levers 30 will be set loose in the cockpit of the vehicle 10.

Figure 5:
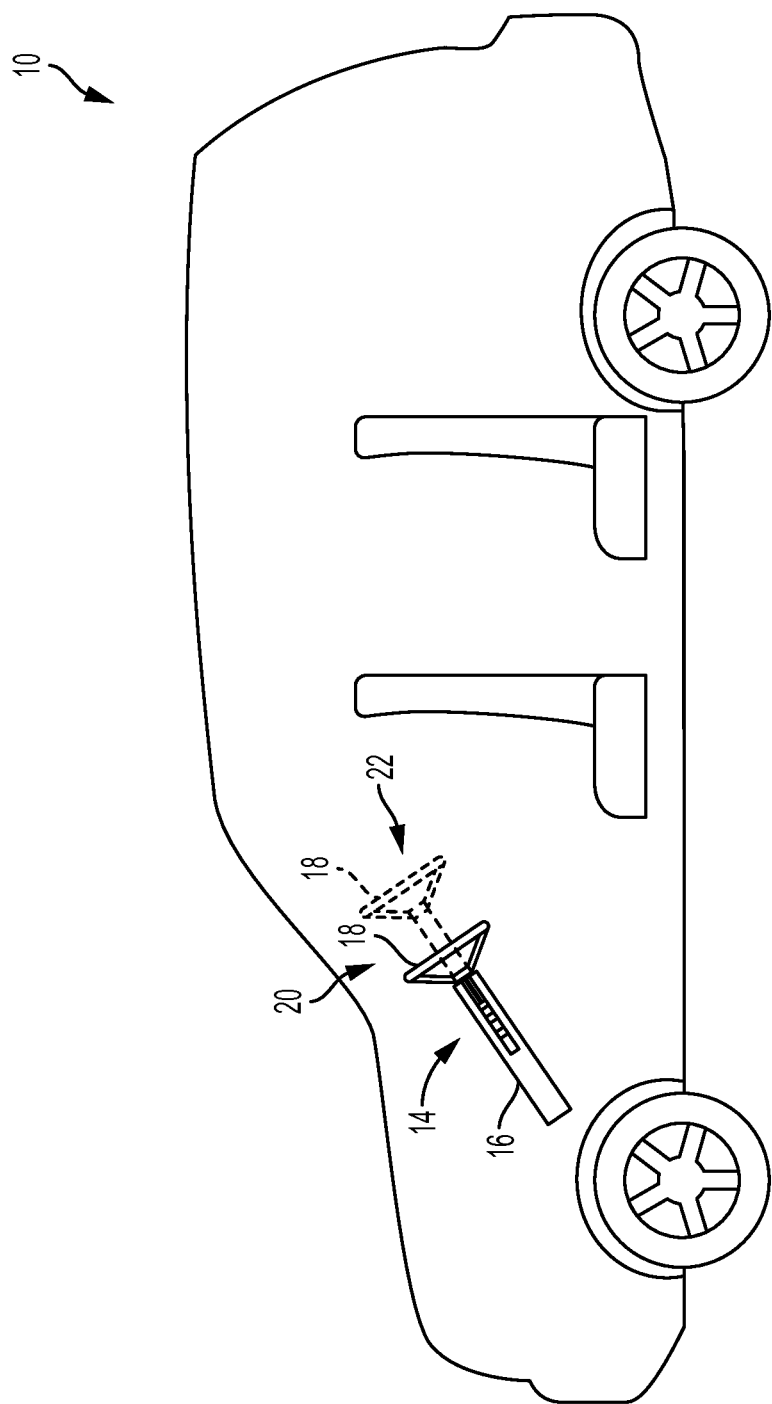
FIG. 5 is a schematic view of a vehicle including the retractable steering column.

FIG. 5 shows a schematic embodiment of the vehicle 10 in which the steering column assembly 14 having the levers 30 may be employed. The vehicle 10 may be an autonomous driving assisted steering ("ADAS") equipped vehicle, and includes the retractable steering column assembly 14, steering column shaft 16, and steering input device 18, such as the steering wheel 18, coupled thereto. The steering column assembly 14 is movable between the retracted position 20, and a deployed or driving position 22. In the driving position 22, steering wheel 18 may be used by a driver to steer the vehicle 10. In the retracted position 20, portions of assembly 14, such as steering wheel 18, are disposed away from the driver, which provides increased space for the driver. The displacement of the steering column 16 and wheel 18 in retracted position 20 creates additional cabin space for the driver's comfort and convenience to perform non-driving activities including, but not limited to, reading, working, entertaining, eating, texting, etc. Cabin space is increased by enabling retraction of the steering column assembly 14 further in the direction 52 by automatically folding the levers 30 towards the steering column 16 when they abut the edges 56 of the instrument cluster 54. During extension of the steering column assembly 14, the levers 30 are automatically unfolded as the levers 30 move past the instrument cluster in direction 58. Thus, no driver intervention is required and the levers 30 provide an inexpensive mechanical solution to increase the cabin space of an ADAS vehicle 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
    a steering column having a longitudinal axis; and,
    a lever having a first end and a second end, the second end of the lever attached to the steering column, a hinge disposed between the first end and the second end of the lever, the first end of the lever biased away from the steering column in a first condition and folded at the hinge towards the steering column in a second condition.

2. The steering column assembly of claim 1, wherein the first end of the lever is spaced from the steering column in the first condition, and the first end of the lever is folded against the steering column in the second condition.

3. The steering column assembly of claim 1, wherein the hinge includes a spring.

4. The steering column assembly of claim 1, wherein the lever includes a first section having the first end, a second section having the second end, and the hinge includes a torsion spring having a first leg fixed to the first section and a second leg fixed to the second section.

5. The steering column assembly of claim 1, wherein a first section of the lever between the hinge and the first end has a longitudinal axis that is substantially parallel to the longitudinal axis of the steering column in the second condition of the lever.

6. The steering column assembly of claim 1, wherein the lever is a turning signal lever.

7. The steering column assembly of claim 1, wherein the lever is a wiper lever.

8. The steering column assembly of claim 1, further comprising a connector arranged to connect the second end of the lever to the steering column, the hinge spaced from the connector by a second section of the lever, the first section pivotal with respect to the second section.

9. The steering column assembly of claim 8, wherein the second section extends at a first angle with the longitudinal axis of the steering column in the first and second conditions of the lever, and the first section forms a second angle smaller than the first angle with the longitudinal axis of the steering column in the second condition of the lever.

10. The steering column assembly of claim 1, further comprising a shroud, the shroud arranged to at least partially surround the steering column and the second end of the lever, the shroud including a receiving area to receive a first section of the lever between the hinge and the first end in the second condition of the lever.

11. The steering column assembly of claim 10, wherein the receiving area is a pocket extending longitudinally from the second end of the lever to an end of the shroud.

12. The steering column assembly of claim 10, further comprising a plurality of levers, the shroud including a plurality of receiving areas, each of said levers receivable within a respective receiving area in the second condition of the levers.

13. A vehicle comprising:
    an instrument cluster; and,
    a steering column assembly including:
        a steering column having a longitudinal axis, the steering column movable along the longitudinal axis and with respect to the instrument cluster between an extended position and a retracted position; and,
        a lever having a first end and a second end, the second end of the lever attached to the steering column, a hinge disposed between the first end and the second end of the lever, the first end of the lever biased away from the steering column in the extended position of the steering column and folded at the hinge towards the steering column in the retracted position of the steering column.

14. The vehicle of claim 13, wherein the instrument cluster includes an edge and the lever engages with the edge of the instrument cluster in the retracted position of the steering column to retain the lever in the second condition.

15. The vehicle of claim 13, further comprising a steering input device disposed at an end of the steering column, the second end of the lever longitudinally disposed between the instrument cluster and the steering input device in the extended position of the steering column assembly, and at least a portion of the instrument cluster longitudinally disposed between the second end of the lever and the steering input device in the retracted position of the steering column assembly.

16. The vehicle of claim 13, wherein the lever includes a first section having the first end, a second section having the second end, and the hinge extended between the first and second sections, and the hinge includes a spring.

17. The vehicle of claim 16, wherein the instrument cluster includes an edge and the first section of the lever engages with the edge of the instrument cluster in the retracted position of the steering column, and the first section of the lever is spaced from the instrument cluster in the extended position of the steering column.

18. A method of operating a steering column assembly in a vehicle, the method comprising:
    retracting a steering input device connected to an end of a steering column towards an instrument cluster;
    engaging an edge of the instrument cluster with a lever connected to the steering column; and,
    folding at least a portion of the lever towards the steering column about a hinge of the lever when the lever engages with the edge during the retracting of the steering input device.

19. The method of claim 18, wherein the lever is a turning signal lever and the edge is a first edge, and further comprising engaging a second edge of the instrument cluster with a wiper lever and folding at least a portion of the wiper lever towards the steering column about a hinge of the wiper lever when the wiper lever engages with the second edge during the retracting of the steering input device.

20. The method of claim 18, wherein the hinge includes a spring, and further comprising extending the steering input device to move the lever past the instrument cluster and automatically return the lever to a biased condition of the spring.

21. The method of claim 18, wherein the vehicle is an autonomous driving assisted steering equipped vehicle and the retracting of the steering input device provides additional cabin space in the vehicle for a driver.

22. The method of claim 18, wherein the retracting of the steering input device occurs during a vehicle collision.

\* \* \* \* \*